(12) United States Patent
Sakoske

(10) Patent No.: US 8,202,812 B2
(45) Date of Patent: Jun. 19, 2012

(54) ZINC CONTAINING GLASSES AND ENAMELS

(75) Inventor: George E. Sakoske, Washington, PA (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 13/174,891

(22) Filed: Jul. 1, 2011

(65) Prior Publication Data

US 2011/0277505 A1    Nov. 17, 2011

Related U.S. Application Data

(60) Division of application No. 12/368,331, filed on Feb. 10, 2009, now Pat. No. 8,007,930, which is a continuation-in-part of application No. 12/265,199, filed on Nov. 5, 2008, now abandoned, which is a continuation-in-part of application No. 12/170,530, filed on Jul. 10, 2008, now abandoned.

(51) Int. Cl.
    *C03C 8/06* (2006.01)
    *C03C 8/14* (2006.01)
    *C03C 8/20* (2006.01)
    *C03C 8/16* (2006.01)
    *C03C 8/04* (2006.01)
    *C09D 1/00* (2006.01)
    *C09D 5/00* (2006.01)

(52) U.S. Cl. ............... 501/25; 501/17; 501/18; 501/20; 501/26; 106/31.95

(58) Field of Classification Search ............... 501/14, 501/15, 17, 18, 19, 20, 21, 25, 26; 29/527.2; 106/31.95

See application file for complete search history.

(56) References Cited

U.S. PATENT DOCUMENTS

| | | | | |
|---|---|---|---|---|
| 3,867,157 A | * | 2/1975 | Peeling, Jr. | 501/18 |
| 5,075,263 A | * | 12/1991 | Schittenhelm et al. | 501/25 |
| 5,325,580 A | * | 7/1994 | Gruber et al. | 29/527.4 |
| 5,350,718 A | | 9/1994 | Anquetil et al. | |
| 5,753,685 A | | 5/1998 | Sakoske | |
| 5,817,586 A | | 10/1998 | Harada et al. | |
| 5,939,343 A | * | 8/1999 | Tunker et al. | 501/17 |
| 6,936,556 B2 | | 8/2005 | Sridharan et al. | |
| 7,341,964 B2 | | 3/2008 | Emlemdi | |
| 2006/0172876 A1 | | 8/2006 | Emlemdi | |
| 2007/0054793 A1 | | 3/2007 | Sakoske et al. | |
| 2008/0063876 A1 | | 3/2008 | Sakoske et al. | |

FOREIGN PATENT DOCUMENTS

WO    2007/032977    3/2007

* cited by examiner

*Primary Examiner* — Jerry Lorengo
*Assistant Examiner* — Noah Wiese
(74) *Attorney, Agent, or Firm* — Rankin, Hill & Clark LLP

(57) ABSTRACT

This invention relates to lead free, cadmium free, bismuth free low melting high durability glass and enamel compositions. The compositions comprise silica, zinc, titanium, and boron oxide based glass frits. The resulting compositions can be used to decorate and protect automotive, beverage, architectural, pharmaceutical and other glass substrates.

20 Claims, No Drawings

ZINC CONTAINING GLASSES AND ENAMELS

CROSS REFERENCE TO RELATED APPLICATIONS

This application claims priority to, and is a continuation-in-part of, U.S. application Ser. Nos. 12/170,530, filed 10 Jul. 2008, and Ser. No. 12/265,199, filed 5 Nov. 2008, both of which are entitled "Zinc Containing Glasses and Enamels." The entire disclosure of both said applications are hereby incorporated by reference.

BACKGROUND OF THE INVENTION

1. Field of Invention

This invention relates to low-firing, high durability glass and enamel compositions. In particular, the invention relates to glass frit compositions, and the glasses, ceramics and enamels made therefrom, which include ZnO, $SiO_2$, $B_2O_3$ and $TiO_2$. The glasses have good acid resistance, low CTE ($<100 \times 10^{-7}$) and relatively low firing temperatures ($<1100°$ F.). All of this is achieved without the use of lead or bismuth.

2. Description of Related Art

Glass enamel compositions are well known in the art. One aim of conventional glass and enamel compositions is the achievement of a low firing, high durability glass and enamel having a low coefficient of thermal expansion (CTE). However, such glasses typically require the use of substantial amounts of relatively expensive $Bi_2O_3$.

Partially crystallizing glass enamel compositions that fuse at relatively low temperatures are used, for example, to form opaque dark-colored enamel bands on the outer edges of sections of automotive glass such as windshields and side and rear windows. These opaque dark-colored enamel bands, which typically vary in width from about 1.5 cm to about 15.0 cm, greatly enhance the aesthetic appearance of the sections of glass upon which they are applied and also block the transmission of sunlight through the glass to protect underlying adhesives from degradation by ultraviolet radiation. Moreover, these opaque colored enamel bands preferably have the ability to conceal silver-containing buss bars and wiring connections of rear glass defrosting systems from view from the outside of the vehicle.

Specially formulated glass enamel compositions can be applied to planar sections of glass and fired to form opaque dark-colored enamel bands at the same time as the bending or forming operations were performed on the section of glass. Such glass enamel compositions can fuse and partially crystallize at the temperature at which a section of glass would be preheated preparatory to a bending or forming operation. It is believed that the partial crystallization of the enamel forms a dense, hard, protective layer that prevents the enamel from sticking to the press or vacuum head during the glass bending and transporting operations.

Although improvements have been made in recent years, the chemical durability of known lead-free and cadmium-free glass enamel systems used in tableware, decorative ware, and automotive glass applications has been less than desired. Further, the presence of bismuth, an increasingly expensive metal, has been required in such formulations as a lead replacement. Therefore, a need exists for lead-free and cadmium-free (and preferably bismuth-free) enamel compositions that exhibit excellent chemical durability to acids, water, and alkalis. Such enamel compositions must be able to fuse and preferably, partially crystallize at temperatures at which sections of glass are preheated preparatory to forming operations so as not to stick to press or vacuum heads. Moreover, such enamel compositions should be effective in blocking ultraviolet radiation and in retarding the migration of silver and subsequent showing from overprinted buss bars and wiring connections of rear glass defrosting systems.

BRIEF SUMMARY OF THE INVENTION

The invention relates to a range of low firing, high durability glasses, glass frits, and glass enamel compositions. Automotive designs employ a black glass-ceramic enamel obscuration band around the periphery of glass windshields to hide unevenness and protect the underlying adhesive from ultraviolet degradation. Architectural, appliance, and container/dishware glass applications often include glass ceramic materials for decorative purposes. Conventional low firing, high durability enamel systems require the use of expensive bismuth borosilicate glass frits. The invention relates to a range of glass frits including the oxides of zinc, boron, titanium and silicon. The glass and enamel compositions fired therefrom will pass high durability acid testing, including, for example, performance of more than six hours in 0.1 N $H_2SO_4$ at 80° C., and in many cases, performance of more than 24 hours. As seen in Table 2, below, all inventive examples of the enamels herein have performances in 0.1 N $H_2SO_4$ of at least 34 hours. In addition, crystalline seed materials including, for example zinc borates, zinc titanates, aluminum silicates and others are compatible with the enamel compositions herein, and can yield anti-stick properties advantageous in press-bend forming operations such as those used in the automotive glass industry.

In particular, the invention provides an enamel composition comprising a solids portion comprising a frit portion, wherein the frit portion comprises, prior to firing: (a) 38-60 wt % $SiO_2$, (b) 5.1-22.9 wt % $B_2O_3$, (c) 8.1-18 wt % $TiO_2$, (d) 0.1-14.9 wt % ZnO, (e) 0.1-4.5 wt % $Li_2O$ (f) 0.1-18 wt % $K_2O$, and (g) 1-7 wt % F.

In another embodiment, the invention involves a method of decorating a substrate comprising: (a) applying to the substrate a coating of an enamel composition comprising a solids portion, comprising a frit portion comprising, prior to firing: (i) 38-60 wt % $SiO_2$, (ii) 5.1-22.9 wt % $B_2O_3$, (iii) 8.1-18 wt % $TiO_2$, (iv) 0.1-14.9 wt % ZnO, (v) 0.1-3.5 wt % $Li_2O$ (vi) 0.1-18 wt % $K_2O$, and (vii) 1-7 wt % F, and (b) firing the substrate and coating at a temperature sufficient to flow the enamel composition to cause the enamel composition to adhere to the substrate.

Still another embodiment of the invention is a high-durability bismuth-free, lead-free, cadmium-free enamel composition comprising (a) a pigment, and (b) a frit portion, wherein the frit portion comprises, prior to firing: (i) 38-60 wt % $SiO_2$, (ii) 5.1-22.9 wt % $B_2O_3$, (iii) 8.1-18 wt % $TiO_2$, (iv) 0.1-14.9 wt % ZnO, (v) 0.1-4.5 wt % $Li_2O$, (vi) 0.1-18 wt % $K_2O$, and (vii) 1-7 wt % F, wherein the enamel composition exhibits performance of chemical durability against wet through deterioration of at least 24 hours when tested in 0.1 N $H_2SO_4$ at 80° C.

In yet another embodiment, the invention involves a substrate bearing a fired coating, the fired coating comprising a frit portion, said frit portion comprising, prior, to firing, (a) 38-60 wt % $SiO_2$, (b) 5.1-22.9 wt % $B_2O_3$, (c) 8.1-18 wt % $TiO_2$, (d) 0.1-14.9 wt % ZnO, (e) 0.1-4.5 wt % $Li_2O$ (f) 0.1-18 wt % $K_2O$, and (g) 1-7 wt % F.

Finally, an embodiment of the invention is a method of decorating a glass substrate comprising: (a) applying to a glass substrate an enamel composition comprising a solids portion, wherein the solids portion comprises a frit portion, wherein the frit portion comprises, prior to firing: (i) 38-60 wt % $SiO_2$, (ii) 5.1-22.9 wt % $B_2O_3$, (iii) 8.1-18 wt % $TiO_2$, (iv) 0.1-14.9 wt % ZnO, (v) 0.1-4.5 wt % $Li_2O$ (vi) 0.1-18 wt % $K_2O$, and (vii) 1-7 wt % F, and (c) firing the substrate and enamel composition at a temperature sufficient to flow the enamel composition to cause the enamel composition to at least partially adhere to the glass substrate.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Enamel compositions of the invention include a glass frit portion, which in turn includes a combination of the oxides of zinc, boron, silicon and titanium, as well as fluoride ion.

In particular, the invention provides an enamel composition comprising a solids portion comprising a frit portion, wherein the frit portion comprises, prior to firing: (a) 38-60 wt % $SiO_2$, (b) 5.1-22.9 wt % $B_2O_3$, (c) 8.1-18 wt % $TiO_2$, (d) 0.1-14.9 wt % ZnO, (e) 0.1-4.5 wt % $Li_2O$ (f) 0.1-18 wt % $K_2O$, and (g) 1-7 wt % F.

In another embodiment, the invention involves a method of decorating a substrate comprising: (a) A method of decorating a substrate comprising applying to the substrate a coating of an enamel composition comprising a solids portion, comprising a frit portion comprising, prior to firing: (i) 38-60 wt % $SiO_2$, (ii) 5.1-22.9 wt % $B_2O_3$, (iii) 8.1-18 wt % $TiO_2$, (iv) 0.1-14.9 wt % ZnO, (v) 0.1-3.5 wt % $Li_2O$ (vi) 0.1-18 wt % $K_2O$, and (vii) 1-7 wt % F, and (b) firing the substrate and coating at a temperature sufficient to flow the enamel composition to cause the enamel composition to adhere to the substrate.

Still another embodiment of the invention is a high-durability bismuth-free, lead-free, cadmium-free enamel composition comprising (a) a pigment, and (b) a frit portion, wherein the frit, portion comprises, prior to firing: (i) 38-60 wt % $SiO_2$, (ii) 5.1-22.9 wt % $B_2O_3$, (iii) 8.1-18 wt % $TiO_2$, (iv) 0.1-14.9 wt % ZnO, (v) 0.1-4.5 wt % $Li_2O$, (vi) 0.1-18 wt % $K_2O$, and (vii) 1-7 wt % F, wherein the enamel composition exhibits performance of chemical durability against wet through deterioration of at least 24 hours when tested in 0.1N $H_2SO_4$ at 80° C.

In yet another embodiment, the invention involves a substrate bearing a fired coating, the fired coating comprising a frit portion, said frit portion comprising, prior to firing, (a) 38-60 wt % $SiO_2$, (b) 5.1-22.9 wt % $B_2O_3$, (c) 8.1-18 wt % $TiO_2$, (d) 0.1-14.9 wt % ZnO, (e) 0.1-4.5 wt % $Li_2O$ (f) 0.1-18 wt % $K_2O$, and (g) 1-7 wt % F.

Finally, an embodiment of the invention is a method of decorating a glass substrate comprising: (a) applying to a glass substrate an enamel composition comprising a solids portion, wherein the solids portion comprises a frit portion, wherein the frit portion comprises, prior to firing: (i) 38-60 wt % $SiO_2$, (ii) 5.1-22.9 wt % $B_2O_3$, (iii) 8.1-18 wt % $TiO_2$, (iv) 0.1-14.9 wt % ZnO, (v) 0.1-4.5 wt % $Li_2O$ (vi) 0.1-18 wt % $K_2O$, and (vii) 1-7 wt % F, and (c) firing the substrate and enamel composition at a temperature sufficient to flow the enamel composition to cause the enamel composition to at least partially adhere to the glass substrate.

The components of the inventive compositions, articles and methods are detailed hereinbelow. Compositional percentages are by weight. Certain embodiments of the invention are envisioned where at least some percentages, temperatures, times, and ranges of other values are preceded by the modifier "about." All compositional percentages are by weight and are given for a blend prior to firing. Details on each ingredient follow.

Frit (Glass) Component. The principal glass and enamel compositions herein include $SiO_2$, $B_2O_3$, $TiO_2$, ZnO, $Li_2O$, $K_2O$ and $F_2$. In particular, broad and preferred embodiments of the glass and enamel compositions herein are detailed below. The glass frit compositions herein include $SiO_2$: broadly 38-60%, preferably 41-51% and more preferably 45-50%; $B_2O_3$: broadly 5.1-22.9%; preferably 6-17% and more preferably 8-15%; $TiO_2$: broadly 8.1-18 wt %, preferably 8.5-13%, more preferably 11-15%; ZnO: broadly 0.1-14.9%; preferably 5.1-13%; more preferably 8-12%; $Li_2O$: broadly 0.1-4.5%, preferably 0.1-3%, more preferably 0.5-2.5%; $K_2O$: broadly 0.1-18%; preferably 1-7.9%, more preferably 1.7-4%; and F: broadly 1-7%, preferably 1.5-6%, more preferably 2-5%. Alternately, the $TiO_2$ content may be 10.5-18 wt %, preferably 11-17 wt % and more preferably 11.5-16.5 wt %. Alternately, the $SiO_2$ content may be 20.1-22.9%, preferably 20.5-22.5%. Alternately, the ZnO content may be 13.1-14.9%, preferably 13.3-14.7%.

Other embodiments are possible, using, for example, a combination of ranges of oxides indicated hereinabove as "broad," "preferred" and "more preferred" in various combinations, so long as such combinations of ranges can add up to 100 wt %. For example, 38-60 wt % $SiO_2$; 8-15 wt % $B_2O_3$; 8.5-13 wt % $TiO_2$ 8-12 wt % ZnO, 0.1-4.5 wt % $Li_2O$, 0.1-18 wt % $K_2O$, and 1-7 wt % F. Another possible embodiment is 41-51 wt % $SiO_2$, 5.1-22.9 wt % $B_2O_3$, 11-15 wt % $TiO_2$, 5.1-13 wt % ZnO, 0.1-3 wt % $Li_2O$, 1-7.9 wt % $K_2O$ and 1-7 wt % F. Yet another is 38-60 wt % $SiO_2$, 5.1-22.9 wt % $B_2O_3$, 10.5-18 wt % $TiO_2$, 0.1-14.9 wt % ZnO, 0.1-4.5 wt % $Li_2O$, 0.1-18 wt % $K_2O$, and 1-7 wt % F. Another embodiment is 38-60 wt % $SiO_2$, 6-17% wt % $B_2O_3$, 10.5-18 wt % $TiO_2$, 0.1-14.9 wt % ZnO, 0.1-4.5 wt % $Li_2O$, 0.1-18 wt % $K_2O$, and 1-7 wt % F. Another possible embodiment comprises 38-60 wt % $SiO_2$, 5.1-22.9 wt % $B_2O_3$, 11-15 wt % $TiO_2$, 0.1-14.9 wt % ZnO, 0-4.5 wt % $Li_2O$, 0.1-18 wt % $K_2O$ and 1-7 wt % F, wherein the frit is substantially free of oxides of tantalum. Still other combinations are possible, as will be evident by examining the preceding paragraph.

Secondary, optional, oxides may be added to flits according to the formulations in the preceding two paragraphs in the following weight percentages: $Al_2O_3$, 0.1-1.9%, preferably 0.1-0.95, more preferably 0.1-0.8%; $ZrO_2$: 0.1-4%, preferably 0.1-1.5%, more preferably 0.1-0.8%; and $Na_2O$: 0.1-13%, preferably 5-12%, more preferably 8-11%.

Additional oxides can be added to any previously described embodiment, singly, or in any combination, up to the noted weight percentage: $Cs_2O$: 2%; MgO:5%; $CeO_2$: 5%; MnO: 10%; CuO: 5%; NiO 5%; SnO: 10%; $P_2O_5$: 5%; $V_2O_5$: 10%; $La_2O_3$: 5%; $Pr_2O_3$: 5%; $In_2O_3$: 5%; $Fe_2O_3$: 10%; $Cr_2O_3$: 5%; CoO: 5%; $Nb_2O_5$: 4; $WO_3$: 4; and $MoO_3$: 4. In a preferred embodiment, the frit portions of the enamel compositions herein further comprise at least one of the noted additional oxides where the range has a lower bound of 0.1%. The frit portions of the enamel compositions herein may also include 0.1-4.9% $Bi_2O_3$, but this is not preferred. It is also preferred that the frits herein, and the overall enamel compositions herein, are substantially free of, and preferably devoid of oxides of antimony and oxides of tantalum.

As can be seen above, the composition of the glass frits useful in this invention can be adapted over a broad range of oxide compositions. Glasses may be formulated according to the principal glass and enamel compositions above, together with, optionally one or more secondary or additional oxides.

The glass and enamel compositions herein typically contain low amounts of PbO, CdO and $Bi_2O_3$, i.e., less than 5 wt % of each, preferably less than 1 wt % of each, more preferably less than 0.5 wt % of each, and even more preferably, less than 0.1 wt % of each. Most preferably, the glass and enamel compositions herein are substantially free of, and preferably devoid of intentionally added PbO, CdO, and $Bi_2O_3$. Still more preferably, the glass frit compositions herein and the enamels made therefrom are absolutely devoid of lead, cadmium, and bismuth in any form. However, certain embodiments not involving food or beverage storage may intentionally include oxides of lead, cadmium, bismuth, or any combination thereof.

Sulfide glass frits are glass frits that contain a metal sulfide component. Certain embodiments of the invention include sulfide ions provided by elemental sulfur or metallic sulfides. Exemplary sulfide glass frits are disclosed in U.S. Pat. No. 5,350,718 to Antequil et al., which is hereby incorporated by reference. Exemplary sulfides in such frits include ZnS, MnS, FeS, CoS, NiS, $Cu_2S$, CdS, $Sb_2S_3$ and $Bi2S_3$. In particular, the frit portion may further comprise sulfur or a metallic sulfide, or combinations thereof, so as to provide an amount of sulfur to the frit portion not exceeding 4 wt %, all percentages prior to firing. The presence of the sulfides disclosed herein can have a beneficial effect on the glass coatings herein as they act as reducing agents which can prevent or minimize silver migration from a conductive silver metal trace into a glass substrate or coating. A glass component containing both oxide and sulfide frits are also envisioned.

Broadly, the glass frits and enamels useful herein have melting points in the range of about 1000° F. to 1400° F., or any intermediate temperature such as 1030° F., 1040° F., 1050° F., 1060° F., 1080° F., 1110° F., 1150° F., 1190° F., 1200° F., 1210° F., 1250° F., 1275° F., 1300° F., 1325° F., 1350° F., and 1375° F., and various of the frits may be effectively fired at those temperatures. Preferably, the glass frits herein can be fired at 1000-1250° F., more preferably at 1020-1200° F., still more preferably at about 1030-1150° F., and most preferably at about 1040-1100° F.

Generally, the glass frits are formed in a known manner, for example, blending the starting materials (oxides and/or sulfides) and melting together at a temperature of about 1000 to about 1400° C. (about 1830 to about 2550° F.) for about 45 to about 75 minutes to form a molten glass having the desired composition. The molten glass formed can then be suddenly cooled in a known manner (e.g., water quenched) to form a frit. The frit can then be ground using conventional milling techniques to a fine particle size, from about 1 to about 8 microns, preferably 2 to about 6 microns, and more preferably about 3 to about 5 microns.

Crystalline Material. Crystalline materials may be included along with the frit compositions herein to promote crystallization (i.e., crystallization seeds). Crystalline materials useful herein include zinc silicates, zinc borates, zinc titanates, silicon zirconates, aluminum silicates, calcium silicates, and combinations thereof. The crystalline materials may include, without limitation, $Zn_2SiO_4$, $2ZnO.3TiO_2$, $ZnTiO_3$, $ZnO.B_2O_3$, $3ZnO.B_2O_3$, $5ZnO.2B_2O_3$, and $Al_2SiO_5$. The Ruderer U.S. Pat. No. 5,153,150 and Sakoske U.S. Pat. No. 5,714,420 patents noted hereinabove provide further information on crystalline materials. Preferred crystalline materials include zinc silicates such as $Zn_2SiO_4$ and zinc borosilicates such as $ZnO.B_2O_3$. Specific examples of seed materials used herein include product numbers 2077 (bismuth silicate seed material) and 2099 (zinc silicate seed material) manufactured by Ferro Glass and Color Corporation of Washington, Pa. The enamels herein may include 0.1-15 wt %, preferably about 0.5-10 wt %, and more preferably 1-5 wt % of at least one crystalline material.

Decoration and Glass Forming. A glass substrate may be colored or decorated by applying any enamel composition described herein to at least a portion of a substrate, for example, a glass substrate such as a glass sheet, or automotive glass, (i.e., windshield). An enamel composition may, but need not, be applied in the form of a paste as disclosed herein.

In particular, a method of decorating a glass substrate comprising: (a) applying to a glass substrate an enamel composition comprising a solids portion, wherein the solids portion comprises a frit portion, wherein the frit portion comprises, prior to firing: (i) 38-60 wt % $SiO_2$, (ii) 5.1-22.9 wt % $B_2O_3$, (iii) 8.1-18 wt % $TiO_2$, (iv) 0.1-14.9 wt % ZnO, (v) 0.1-4.5 wt % $Li_2O$ (vi) 0.1-18 wt % $K_2O$, and (vii) 1-7 wt % F, and (c) firing the substrate and enamel composition at a temperature sufficient to flow the enamel composition to cause the enamel composition to at least partially adhere to the glass substrate. The enamel composition may be applied to the entire surface of a glass substrate, or to only a portion thereof, for example the periphery.

The method may include a glass forming step whereby the glass substrate is heated to an elevated temperature and subjected to a forming pressure to bend the glass substrate. In particular, bending the glass substrate may involve heating the glass substrate to which has been applied the to an elevated temperature, of, for example, at least about 570° C., at least about 600° C., at least about 625° C., or at least about 650° C. Upon heating, the glass is subjected to a forming pressure, e.g., gravity sag or press bending in the range of 0.1 to 5 psi, or 1-4 psi, or typically about 2-3 psi, with a forming die.

Organic Vehicle. When applied by procedures requiring one, such as screen printing, the foregoing solid ingredients may be combined with an organic vehicle to form a glass enamel composition, which is a paste. The paste in general contains 60-90 wt % solids, (a paste ratio as noted in the Examples of 1.5:1 to 9:1), preferably 65-85%, more preferably 70-80 wt %, as above described and 10-40% of an organic vehicle, preferably 15-35%, more preferably 20-30%. The viscosity of the paste is adjusted so that it can be screen-printed, roll coated, sprayed, or otherwise applied in a desired manner onto the desired substrate. Other preferred paste ratios are about 3.5:1 to 4.5:1, and more preferably about 3.7:1 to 4.4:1.

The organic vehicle comprises a binder and a solvent, which are selected based on the intended application. It is essential that the vehicle adequately suspend the particulates (i.e., frit, pigment, crystalline material) and burn off completely upon firing. In particular, binders including methyl cellulose, ethyl cellulose, and hydroxypropyl cellulose, and combinations thereof, may be used. Suitable solvents include propylene glycol, diethylene glycol butyl ether; 2,2,4-trimethyl pentanediol monoisobutyrate (Texanol™); alpha-terpineol; beta-terpineol; gamma terpineol; tridecyl alcohol; diethylene glycol ethyl ether (Carbitol™), diethylene glycol butyl ether (Butyl Carbitol™); pine oils, vegetable oils, mineral oils, low molecular weight petroleum fractions, tridecyl alcohols, and synthetic or natural resins and blends thereof. Surfactants and/or other film forming modifiers can also be included. The solvent and binder may be present in a weight ratio of about 50:1 to about 20:1. The preferred vehicle is a combination of Butyl Carbitol™ (diethylene glycol monobutyl ether) and ethyl cellulose in a weight ratio of about 200:1 to 20:1, preferably 50:1 to about 20:1, more preferably about 40:1 to about 25:1.

In general, the enamel pastes are viscous in nature, with the viscosity depending upon the application method to be employed and end use. For purposes of screen-printing, viscosities ranging from 10,000 to 80,000, preferably 15,000 to 35,000 centipoise, and more preferably 18,000 to 28,000 centipoise at 20° C., as determined on a Brookfield Viscometer, #29 spindle at 10 rpm, are appropriate.

Pigments. In certain embodiments, the glass frit can be combined with a pigment, such as a mixed metal oxide pigment. When used, such pigments generally constitute no greater than about 30 wt %, preferably 0.1-30%, more preferably 1-25 wt %, still more preferably 2-20 wt %, of the glass enamel compositions herein, depending upon the range of color, gloss, and opacity (i.e., transmittance) desired.

Keeping in mind the general preference for completely lead-free, cadmium-free, and bismuth-free compositions for food and beverages, useful pigments may come from several of the major classifications of complex inorganic pigments, including corundum-hematite, olivine, priderite, pyrochlore, rutile, spinel, and spinel, though other categories such as baddeleyite, borate, garnet, periclase, phenacite, phosphate, sphene and zircon may be suitable in certain applications. Oxides of the metals cobalt, chromium, manganese, praseodymium, iron, nickel, and copper are often useful. In particular, specific pigments include cobalt silicate blue olivine $Co_2SiO_4$; nickel barium titanium primrose priderite $2NiO:3BaO:17TiO_2$; nickel antimony titanium yellow rutile $(Ti,Ni,Nb)O_2$; nickel niobium titanium yellow rutile $(Ti,Ni,Nb)O_2$; nickel tungsten yellow rutile $(Ti,Ni,W)O_2$; chrome antimony titanium buff $(Ti,Cr,Sb)O_2$; chrome niobium titanium buff rutile $(Ti,Cr,Nb)O_2$; chrome tungsten titanium buff rutile $(Ti,Cr,W)O_2$; manganese antimony titanium buff rutile $(Ti,Mn,Sb)O_2$; titanium vanadium grey rutile $(Ti,V,Sb)O_2$; manganese chrome antimony titanium brown rutile $(Ti,Mn,Cr,Sb)O_2$; manganese niobium titanium brown rutile $(Ti,Mn,Nb)O_2$; cobalt aluminate blue spinel $CoAl_2O_4$; zinc chrome cobalt aluminum spinel $(Zn,Co)(Cr,Al)_2O_4$; cobalt chromate blue-green spinel $CoCr_2O_4$; cobalt titanate green spinel $Co_2TiO_4$; iron chromite brown spinel $Fe(Fe,Cr)_2O_4$; iron titanium brown spinel $Fe_2TiO_4$; nickel ferrite brown spinel $NiFe_2O_4$; zinc ferrite brown spinel $(Zn,Fe)Fe_2O_4$; zinc iron chromite brown spinel $(Zn,Fe)(Fe,Cr)_2O_4$; copper chromite black spinel $CuCr_2O_4$; iron cobalt chromite black spinel $(Co,Fe)(Fe,Cr)_2O_4$; chrome iron manganese brown spinel $(Fe,Mn)(Cr,Fe)_2O_4$; chrome iron nickel black spinel $(Ni,Fe)(Cr,Fe)_2O_4$; and chrome manganese zinc brown spinel $(Zn,Mn)(Cr_2O_4)$. Only in applications where lead is permitted (i.e., other than food or beverage containers, tableware, etc.), lead antimonite yellow pyrochlore $(Pb_2Sb_2O_7)$ or other lead-containing pigments may be used. Commercially available examples of suitable pigments are available from Ferro Glass and Color Corporation, such as 2991 pigment (copper chromite black), 2980 pigment (cobalt chromium iron black), 2987 pigment (nickel manganese iron chromium black), and O-1776 pigment (black). In some embodiments, pigments free from Co, Cu, Cr, Ni and the like such a 10201 black (bismuth manganate) would also be suitable. In a preferred embodiment, no bismuth is present in the pigment.

Especially preferred are pigments having the following Ferro Corporation product numbers and formulas: K393 (CuCrMn), V792(NiMnCrFe), 2503(CdSeS), 2336(CoAl), and 2501(CdSeS), however this is in the context of the overall preference for enamels that are free of intentionally added lead, cadmium and bismuth.

Metal. Certain embodiments of the enamels herein may advantageously include one or more metals in relatively small amounts. For example, the enamel may include a metal such as silicon, added separately from any oxide, in an amount of 0.1 to 5 wt %, preferably 0.5 to about 4.5 wt % more preferably 1 to 4 wt %. Silicon metal is a reducing agent which prevents or minimizes the extent of oxidation, especially of silver metal in conductive traces, however sulfides also act as reducing agents. Such reducing agents have the desired effect of preventing or minimizing the extent of silver migration into a glass substrate or coating. Other metals that enhance the desired properties of the glass enamels herein or at a minimum, do not degrade such desired properties, are also envisioned herein. For example, metals from which the oxides used in the frits or pigments herein may be used, keeping in mind the preferences for low or essentially zero levels of heavy metals such as lead, cadmium, and bismuth.

The solids portion of the enamel is considered to be the glass frit portion, the pigment, the crystallization material, and the metal, taken together.

Properties. The glass articles herein are coated in order to impart desired properties to the article. The properties of acid resistance, heavy metal release, color, gloss, and light transmittance, characterize the final finished products are detailed hereinbelow.

Acid Resistance. The glass and enamel compositions herein, and the fired glass, ceramic, and enamel coatings obtained by the firing thereof are often used in harsh environments, including, for example, automotive or architectural glass, institutional table ware, and others.

Heavy Metal Release. Because the inventive glass and enamel compositions herein may be used to decorate glassware for preparing, serving, and storing food, it is important that such compositions contain extremely low concentrations of toxic heavy metals, such as lead and cadmium. Further, in the in the inevitable event that the glass and enamel compositions contains a small portion of such toxic metals, it is important that the glass and enamel compositions do not release the heavy metals, or do so only at very low levels. For example, it is an advantage of the glass and enamel compositions herein release less than 100 ppm of heavy metals of any kind when subjected to a strong detergent attack as set forth in DTM 77, described hereinbelow. It is more preferred that the glass and enamel compositions release less than 75 ppm, and even more preferred when less than 50 ppm is released. It is still more preferred that less than 25 ppm be released.

Dispersing Surfactant. A dispersing surfactant assists in pigment wetting, when an insoluble particulate inorganic pigment is used. A dispersing surfactant typically contains a block copolymer with pigment affinic groups. For example, surfactants sold under the Disperbyk® and Byk® trademarks by Byk Chemie of Wesel, Germany, such as Disperbyk 162 and 163, which are solutions of high molecular weight block copolymers with pigment affinic groups, and a blend of solvents (xylene, butylacetate and methoxypropylacetate). Disperbyk 162 has these solvents in a 3/1/1 ratio, while the ratio in Disperbyk 163 is 4/2/5. Disperbyk 140 is a solution of alkyl-ammonium salt of an acidic polymer in a methoxypropylacetate solvent.

Rheological Modifier. A rheological modifier is used to adjust the viscosity of the green pigment package composition. A variety of rheological modifiers may be used, including those sold under the Byk®, Disperplast®, and Viscobyk® trademarks, available from Byk Chemie. They include, for example, the BYK 400 series, such as BYK 411 and BYK 420, (modified urea solutions); the BYK W-900 series, (pigment wetting and dispersing additives); the Disperplast series, (pigment wetting and dispersing additives for plastisols and organosols); and the Viscobyk series, (viscosity depressants for plastisols and organosols).

Flow aid. A flow aid is an additive used to control the viscosity and rheology of a pigment or paste composition, which affects the flow properties of liquid systems in a controlled and predictable way. Rheology modifiers are generally considered as being either pseudoplastic or thixotropic in nature. Suitable surfactants herein include those sold commercially under the Additol®, Multiflow®, and Modaflow® trademarks by UCB Surface Specialties of Smyrna, Ga. For example, Additol VXW 6388, Additol VXW 6360, Additol VXL 4930, Additol XL 425, Additol XW 395, Modaflow AQ 3000, Modaflow AQ 3025, Modaflow Resin, and Multiflow Resin.

Adhesion promoter. Adhesion promoting polymers are used to improve the compatibility between a polymer and a filler. Suitable adhesion promoters include those sold by GE Silicones of Wilton, Conn. under the Silquest®, CoatOSil®, NXT®, XL-Pearl™ and Silcat® trademarks. Examples include the following product numbers, sold under the Silquest® trademark: A1101, A1102, A1126, A1128, A1130, A1230, A1310, A162, A174, A178, A187, A2120. For example, Silquest® A-187 is (3-glycidoxypropyl) trimethoxysilane, which is an epoxysilane adhesion promoter. The inventors herein have found that aromatic epoxies crosslinked with amines or amides produced unacceptable results. Silanes sold by Degussa AG of Düsseldorf, Germany, under the Dynasylan® trademark are also suitable. Most preferred herein is Silquest A187.

Stabilizers. Light or UV stabilizers are classified according to their mode of action: UV blockers—that act by shielding the polymer from ultraviolet light; or hindered amine light stabilizers (HALS)—that act by scavenging the radical intermediates formed in the photo-oxidation process. The compositions of the invention comprise about 0.1 to about 2 wt % of a light stabilizer, preferably about 0.5 to about 1.5%, and further comprise about 0.1 to about 4 wt % of a UV blocker, preferably about 1 to about 3%.

Light stabilizers and UV blockers sold under the Irgafos®, Irganox®, Irgastab®, Uvitex®, and Tinuvin® trademarks by from Ciba Specialty Chemicals, Tarrytown, N.Y., may be used, including product numbers 292 HP, 384-2, 400, 405, 411L, 5050, 5055, 5060, 5011, all using the Tinuvin trademark. Suitable UV blocking agents include Norbloc 7966 (2-(2' hydroxy-5' methacryloxyethylphenyl)-2H-benzotriazole); Tinuvin 123 (bis-(2,2,6,6-tetramethyl-1-(octyloxy)-4-piperidinyl) ester); Tinuvin 99 (3-(2H-benzotriazole-2-yl) 5-(1,1-dimethyl ethyl)-4-hydroxybenzenepropanoic acid, C7-9-branched alkyl esters) Tinuvin 171 (2-(2H-benzotriazol-2-yl)-6-dodecyl-4-methyl-phenol). Products sold under the Norbloc® trademark are available from Janssen Pharmaceutica of Beerse, Belgium.

Suitable hindered amine light stabilizers (HALS) are sold by the Clariant Corporation, Charlotte, N.C., under the Hostavin® trademark, including Hostavin 845, Hostavin N20, Hostavin N24, Hostavin N30, Hostavin N391, Hostavin PR31, Hostavin ARO8, and Hostavin PR25. HALS are extremely efficient stabilizers against light-induced degradation of most polymers. They do not absorb UV radiation, but act to inhibit degradation of the polymer, thus extending its durability. Significant levels of stabilization are achieved at relatively low concentrations. The high efficiency and longevity of HALS are due to a cyclic process wherein the HALS are regenerated rather than consumed during the stabilization process. They also protect polymers from thermal degradation and can be used as thermal stabilizers.

Examples. The following compositions represent exemplary embodiments of the invention. They are presented to explain the invention in more detail, and do not limit the invention. High durability glass frit compositions according to the present invention are given in Table 1, Frits A-J. Comparative frits are given at the left side of Table 1 (3 columns). The thermal expansion coefficient was determined from room temperature to 300° C. using an Orton model 1000R dilatometer. The glass transition temperature is Tg and the dilatometric softening point is Td. The firing temperature determination is described herein. The "firing temperature" is the temperature where the frit particles begin to melt and sinter together upon heating. The room temperature chemical durabilities were determined as described hereinbelow for 4% acetic acid, 10% citric acid, and 10% hydrochloric acid solutions.

Heavy Metal (cadmium) release of selected enamels in Table 1 is also presented. Sample automotive windshield enamels were also made using these compositions as presented in Table 2. The paste ratio is the weight ratio of solid constituents (glass frits, pigments, crystalline materials, metals) to organic vehicle. The minimum fire of the enamel is determined as described below. The acid test using immersion in 0.1 N sulfuric acid at 80° C. is commonly called the Toyota test. Results are reported in hours where The wet through method was used to determine point of failure as described below. Conventional low firing zinc-based enamels have not been able to survive wet through for more than 4 hours of exposure to 0.1 N sulfuric acid at 80° C.

TABLE 1

Frit formulations in wt %, firing temperatures, data on acid resistance and heavy metal release.

| Oxide | Comparative Frit 1 | Comparative Frit 2 | Comparative Frit 3 | Frit A | Frit B | Frit C | Frit D | Frit E | Frit F | Frit G | Frit H | Frit I | Frit J |
|---|---|---|---|---|---|---|---|---|---|---|---|---|---|
| $Nb_2O_5$ | 0.00 | 0.00 | 0.00 | 0.00 | 0.00 | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 | 0.00 | 0.00 | 0.00 | 0.00 | 0.00 |
| $SiO_2$ | 20.52 | 20.31 | 38.82 | 45.02 | 44.50 | 42.04 | 39.74 | 45.28 | 40.87 | 47.72 | 47.58 | 41.01 | 43.51 |
| $TiO_2$ | 0.00 | 1.64 | 7.65 | 9.51 | 9.41 | 8.89 | 12.38 | 9.57 | 12.73 | 12.47 | 10.06 | 8.89 | 10.71 |
| $ZrO_2$ | 1.15 | 7.93 | 0.00 | 0.67 | 0.67 | 0.63 | 0.59 | 0.68 | 0.61 | 0.00 | 0.71 | 1.27 | 0.67 |
| $Al_2O_3$ | 3.26 | 1.64 | 0.00 | 0.66 | 0.65 | 0.62 | 0.58 | 0.66 | 0.60 | 1.41 | 0.70 | 0.33 | 0.65 |
| $B_2O_3$ | 30.09 | 27.17 | 9.69 | 14.39 | 14.22 | 13.44 | 12.70 | 14.47 | 13.07 | 16.21 | 15.21 | 22.56 | 14.24 |
| $Bi_2O_3$ | 0.00 | 0.00 | 0.00 | 0.00 | 0.00 | 0.00 | 1.51 | 0.00 | 0.00 | 0.00 | 0.00 | 0.00 | 0.00 |
| $SO_3$ | 0.00 | 0.00 | 0.00 | 0.00 | 1.15 | 1.14 | 1.08 | 0.00 | 0.00 | 0.00 | 0.00 | 0.00 | 0.00 |
| CaO | 0.00 | 5.39 | 0.00 | 0.00 | 0.00 | 0.00 | 0.00 | 0.00 | 0.00 | 0.00 | 0.00 | 0.00 | 0.00 |
| PbO | 0.00 | 0.00 | 0.00 | 0.00 | 0.00 | 0.00 | 0.00 | 0.00 | 0.00 | 0.00 | 0.00 | 0.00 | 0.00 |
| ZnO | 33.37 | 24.63 | 34.38 | 11.12 | 10.99 | 10.59 | 10.01 | 11.18 | 10.09 | 0.54 | 6.07 | 7.22 | 13.36 |

TABLE 1-continued

Frit formulations in wt %, firing temperatures, data on acid resistance and heavy metal release.

| | Formula | | | | | | | | | | | | | |
|---|---|---|---|---|---|---|---|---|---|---|---|---|---|---|
| Oxide | Comparative Frit 1 | Comparative Frit 2 | Comparative Frit 3 | Frit A | Frit B | Frit C | Frit D | Frit E | Frit F | Frit G | Frit H | Frit I | Frit J |
| $K_2O$ | 0.00 | 0.00 | 6.06 | 2.36 | 2.33 | 17.57 | 16.60 | 0.67 | 17.08 | 5.01 | 2.49 | 3.12 | 1.22 |
| $Li_2O$ | 0.00 | 0.00 | 1.61 | 1.95 | 1.93 | 1.82 | 1.72 | 1.96 | 1.77 | 2.17 | 2.06 | 1.82 | 1.76 |
| $Na_2O$ | 11.61 | 10.26 | 1.80 | 10.83 | 10.70 | 0.00 | 0.00 | 12.01 | 0.00 | 11.21 | 11.44 | 9.76 | 10.41 |
| $F_2$ | 0.00 | 1.02 | 0.00 | 3.49 | 3.45 | 3.26 | 3.08 | 3.51 | 3.17 | 3.26 | 3.69 | 4.02 | 3.46 |
| Total | 100 | 100 | 100 | 100 | 100 | 100 | 100 | 100 | 100 | 100 | 100 | 100 | 100 |
| TEC ×$10^{-7}$ in/in ° C. | 75.0 | 80.0 | 69.0 | 87.3 | 91.0 | 81.0 | 86.0 | 85.9 | 93.0 | 99.7 | 96.7 | 92 | 86.5 |
| Tg ° C. | 476 | — | 485 | 425 | 436 | 480 | 458 | 423 | 440 | 460 | 430 | 410 | 420 |
| Td ° C. | 520 | — | 534 | 475 | 495 | 530 | 515 | 491 | 496 | 505 | 489 | 460 | 485 |
| Fire Temp ° F. | 1050 | 1110 | 1110 | 1040 | 1050 | 1100 | 1060 | 1035 | 1030 | 1080 | 1070 | 1030 | 1040 |
| 4% Acetic | 5 | — | 1 | 2 | 3 | 1 | 1 | 2 | 1 | 1 | 1 | 2 | 2 |
| 10% Citric | 6 | 5 | 1 | 4 | 3 | 1 | 2 | 4 | 4 | 1 | 2 | 4 | 4 |
| 10% HCl | — | — | 4 | 4 | 1 | 1 | 1 | 4 | 4 | 1 | 2 | 5 | 4 |
| HMR [Cd] PPM | removed | 74.0 | 200 | 3.1 | — | — | — | 3.7 | 3 | 1.4 | 1.3 | 5.6 | 8.2 |

TABLE 2

Enamel formulations in wt %, firing data, and acid resistance performance data for pastes made with selected frits from table 1.

| Glass Used | Comparative Enamel 1 | Comparative Enamel 2 | Comparative Enamel 3 | Enamel A | Enamel B | Enamel C | Enamel D |
|---|---|---|---|---|---|---|---|
| Comparative Frit 1 | 75.00 | | | | | | |
| Comparative Frit 2 | | 75.00 | | | | | |
| Comparative Frit 3 | | | 75.00 | | | | |
| Glass A | | | | 75.00 | | | |
| Glass B | | | | | 73.70 | | |
| Glass C | | | | | | 74.70 | |
| Glass D | | | | | | | 74.70 |
| 2099 | 3.40 | 3.40 | 3.40 | 3.40 | 5.00 | 3.00 | 3.00 |
| 2077 | | | | | | 1.00 | 1.00 |
| K393 | 20.00 | 20.00 | 20.00 | 20.00 | | | |
| O-1776B | | | | | 19.00 | 19.00 | 19.00 |
| V792 | | | | | 2.30 | 2.30 | 2.30 |
| Si Metal | 1.60 | 1.60 | 1.60 | 1.60 | | | |
| | 100.0 | 100.0 | 100.0 | 100.0 | 100.0 | 100.0 | 100.0 |
| MIN FIRE ° F. | 1100 | 1110 | 1170 | 1120 | 1150 | 1180 | 1130 |
| Paste Ratio | 4.4 | 4.2 | 3.75 | 4.0 | 3.7 | 3.7 | 3.7 |
| 4% Acetic acid | 6 | 5 | 3 | 2 | 1 | 1 | 1 |
| 10% Citric acid | 7 | 7 | 4 | 3 | 2 | 1 | 1 |
| 10% HCl acid | 6 | 6 | 4 | 3 | 3 | 1 | 3 |
| 0.1N $H_2SO_4$ at 80° C. (hours) | <1 | <1 | 1-2 | 34-37 | 50-58 | 45-49 | 41-45 |

The testing procedures used herein are as follows, starting with the Firing Temperature Estimate of the frit ("Min Fire" in table 2). A screen printable paste is made by blending 4 g±0.1 grams of test frit with pine oil. After a ten-minute pre-heat at 800° F., the trials are then rapidly transferred to a second furnace at a temperature below the expected firing temperature for the frit for 15 minutes. After 15 minutes in the second furnace, the trials are removed and cooled. This cycle is repeated (at higher temperatures) until the printed frit particles become sintered together and cannot be scratched away. Once the "firing temperature" has been determined, an under-fire of 10° F. below the "firing temperature" is made for confirmation. The Min Fire of the enamel, describes the method for determining the minimum temperature necessary to adequately fuse a ceramic glass enamel to a glass substrate. A screen printable glass-ceramic enamel paste is made, and a 4"×4" test plate is printed and the solvent dried on a hot plate at 200° F. The test plate is placed into the pre-heat furnace, which has already been pre-set at 800° F. and left in the furnace for 6 minutes. Purpose of the pre-heat is to allow the glass test plate and metal firing rack to heat up while also allowing the majority of the organic vehicle to be burnt off before the regular firing. After the 6 minutes time has expired, the test plate is quickly transferred from the pre-heat furnace to a second furnace, previously set at a Min Fire temperature estimate and fired for 4 minutes. After the 4-minute fire, the test plate is removed and cooled to room temperature.

After cooling, the fired maturity of the enamel is checked by using a wet through test. This test involves placing a drop of water on the index finger tip and pressing against the surface of the enamel, then viewing through the glass to see if the water is absorbed through the enamel. The observer will notice either a water spot or mark if wetting through to the substrate occurs. A black felt tip marker can also be used for marking the enamel surface and determining whether absorption (wetting) occurs. If wetting is observed, increase the second Min Fire estimate furnace temperature by 10° F. & repeat. Continue at 10° increments until wetting is no longer observed. If wetting is not observed, decrease the second Min Fire estimate furnace temperature by 10° F. and repeat. Continue at 10° increments until wetting is observed. Minimum firing temperature for a glass enamel is described as that temperature, at 4 minutes, in which the enamel no longer exhibits wetting, thus providing fusing and development of the glass enamel to the glass substrate.

Acid Test Resistance to 10% Citric Acid at Room Temperature, ASTM C-724-91. A visual assessment of the resistance of a glass enamel or frit coating to 10% citric acid at room temperature is made of any residual stain after exposure to the acid solution for 15 minutes. The same test is conducted with respect to a 4 wt % solution of acetic acid at room temperature for a one-minute exposure, and a 10 wt % solution of hydrochloric acid at room temperature for a ten-minute exposure. The rating scale is based upon the following:

Grade 1—No apparent attack

Grade 2—Appearance of iridescence or visible stain on the exposed surface when viewed at an angle of 45°, but not apparent when viewed at angles less than 30°.

Grade 3—A definite stain which does not blur reflected images and is visible at angles less than 30°.

Grade 4—Definite stain with a gross color change or strongly iridescent surface visible at angles less than 30° and which may blur reflected images.

Grade 5—Surface dull or matte with chalking possible.

Grade 6—Significant removal of enamel with pinholing evident.

Grade 7—Complete removal of enamel in exposed area.

Heavy Metal Release. Standard test samples are formulated, fired, and aged. The trials are placed in a 4000 cc stainless steel beaker containing a solution consisting of: 2000 cc distilled water and 6 grams of Super Soilax detergent. During the detergent "aging" exposure prior to HMR testing, the entire trial must be submersed in the solution. The beaker with fired trials is then placed in a constant temperature water bath at 95° C. for 24 hours. After the trials have been exposed to the heated solution for 24 hours, the beaker is removed from the water bath, and the trials are removed from the beaker. The trials are immediately rinsed with tap water, while rubbing the exposed enamel surface to remove any residue. The lead and cadmium release values are obtained by atomic absorption spectrophotometer, and reported as parts per million (PPM).

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

The invention claimed is:

1. A method of decorating a substrate comprising:
    a. applying to the substrate a coating of an enamel composition comprising, prior to firing, an organic vehicle and a solids portion, wherein the solids portion comprises
        i. a frit portion wherein the frit portion comprises, prior to firing:
            1. 38-60 wt % $SiO_2$,
            2. 5.1-22.9 wt % $B_2O_3$,
            3. 8.1-18 wt % $TiO_2$,
            4. 0.1-14.9 wt % $ZnO$,
            5. 0.1-4.5 wt % $Li_2O$
            6. 0.1-18 wt % $K_2O$, and
            7. 1-7 wt % F, and
        ii. 0.1-15 wt % of a crystalline material selected from the group consisting of zinc borates, zinc silicates, zinc titanates, aluminum silicates, and combinations thereof, and
    b. firing the substrate and coating at a temperature sufficient to flow the enamel composition to cause the enamel composition to adhere to the substrate,
    wherein, after firing, the enamel composition is opaque and exhibits performance of chemical durability against wet through deterioration of at least 24 hours when tested in 0.1 N $H_2SO_4$ at 80° C., and
    wherein the substrate is selected from the group consisting of glass, automotive glass, architectural glass and tableware.

2. The method of claim 1, wherein the solids portion further comprises 0.1 to 5 wt % of a metal.

3. The method of claim 1, wherein the solids portion further comprises, prior to firing, a separate and distinct addition of 0.1 to 30 wt % pigment.

4. The method of claim 1, wherein, prior to firing, the frit portion further comprises at least one selected from the group consisting of:
    a. 0.1-1.9 wt % $Al_2O_3$,
    b. 0.1-4 wt % $ZrO_2$, and
    c. 0.1-13 wt % $Na_2O$.

5. The method of claim 1, wherein, prior to firing, the frit portion comprises:
    a. 41-51 wt % $SiO_2$,
    b. 6-17 wt % $B_2O_3$,
    c. 10.5-18 wt % $TiO_2$,
    d. 5.1-13 wt % $ZnO$,
    e. 0.1-3 wt % $Li_2O$
    f. 1-7.9 wt % $K_2O$, and
    g. 1.5-6 wt % F.

6. The method of claim 1, wherein, prior to firing, the frit portion comprises:
    a. 41-51 wt % $SiO_2$,
    b. 6-17 wt % $B_2O_3$,
    c. 8.5-13 wt % $TiO_2$,
    d. 5.1-13 wt % $ZnO$,
    e. 0.1-3 wt % $Li_2O$
    f. 1-7.9 wt % $K_2O$, and
    g. 1.5-6 wt % F.

7. The method of claim 1, wherein the frit portion further comprises sulfur or a metallic sulfide, or combinations thereof, so as to provide an amount of sulfur to the frit portion not exceeding 4 wt %, all percentages prior to firing.

8. The method of claim 1, wherein the frit portion further comprises at least one selected from the group consisting of: (a) 0.1-4.9 wt % $Bi_2O_3$, (b) 0.1-2 wt % $Cs_2O$, (c) 0.1-5 wt % $MgO$, (d) 0.1-5 wt % $CeO_2$, (e) 0.1-10 wt % $MnO$, (f) 0.1-5 wt % $CuO$, (g) 0.1-5 wt % $NiO$, (h) 0.1-10 wt % $SnO$, (i) 0.1-5 wt % $P_2O_5$, (j) 0.1-10 wt % $V_2O_5$, (k) 0.1-5 wt % $La_2O_3$, (l) 0.1-5 wt % $Pr_2O_3$, (m) 0.1-5 wt % $Y_2O_3$, (n) 0.1-5 wt % $In_2O_3$, (o) 0.1-10 wt % $Fe_2O_3$, (p) 0.1-5 wt % $Cr_2O_3$, (q) 0.1-5 wt % $CoO$, (r) 0.1-4 wt % $Nb_2O_5$, (s) 0.1-4 wt % $WO_3$, (t) 0.1-4 wt % $MoO_3$, and combinations thereof.

9. The method of claim 1, wherein the enamel composition further comprises a reducing compound to reduce metals, or to prevent oxidation of metals in the enamel composition, or to control silver migration into the substrate.

10. The method of claim 9 wherein the reducing compounds are selected from the group consisting of silicon metal, zinc sulfide, metallic sulfides, and combinations thereof.

11. The method of claim 1, wherein the enamel composition further comprises a pigment.

12. The method of claim 1, wherein the composition lacks intentionally added bismuth in any form.

13. The method of claim 1, wherein the substrate is glass, automotive glass or architectural glass, and wherein the method further comprises heating the substrate to an elevated temperature and subjecting the substrate to a forming pressure to bend the substrate.

14. The method of claim 13, wherein the elevated temperature is at least about 570° C., and the forming pressure is in the range of 0.1 to 5 psi, and is applied with a forming die.

15. The method of claim 1, wherein the enamel composition is substantially free of oxides of tantalum, and the $TiO_2$ content in the frit portion is in the range of 11-15 wt % $TiO_2$.

16. The method of claim 1, wherein the enamel composition is substantially free of bismuth and antimony.

17. The method of claim 1, wherein the fired enamel composition is opaque, lead-free, cadmium-free, bismuth-free, tantalum-free and antimony-free, the enamel composition further comprising, prior to firing, an organic vehicle.

18. A method of blocking ultraviolet radiation comprising:
   a. applying to the substrate a coating of an enamel composition comprising, prior to firing, an organic vehicle and a solids portion, wherein the solids portion comprises
      i. a frit portion wherein the frit portion comprises, prior to firing:
         1. 38-60 wt % $SiO_2$,
         2. 5.1-22.9 wt % $B_2O_3$,
         3. 8.1-18 wt % $TiO_2$,
         4. 0.1-14.9 wt % ZnO,
         5. 0.1-4.5 wt% $Li_2O$
         6. 0.1-18 wt % $K_2O$, and
         7. 1-7 wt % F, and
      ii. 0.1-15 wt % of a crystalline material selected from the group consisting of zinc borates, zinc silicates, zinc titanates, aluminum silicates, and combinations thereof, and
   b. firing the substrate and coating at a temperature sufficient to flow the enamel composition to cause the enamel composition to adhere to the substrate,
   wherein, after firing, the enamel composition is opaque and exhibits performance of chemical durability against wet through deterioration of at least 24 hours when tested in 0.1 N $H_2SO_4$ at 80° C., and
   wherein the substrate is selected from the group consisting of glass, automotive glass, architectural glass and tableware.

19. A method of forming an automotive windshield comprising:
   a. applying to a glass substrate a coating of an enamel composition comprising, prior to firing, an organic vehicle and a solids portion, wherein the solids portion comprises
      i. a frit portion wherein the frit portion comprises, prior to firing:
         1. 38-60 wt % $SiO_2$,
         2. 5.1-22.9 wt % $B_2O_3$,
         3. 8.1-18 wt % $TiO_2$,
         4. 0.1-14.9 wt % ZnO,
         5. 0.1-4.5 wt % $Li_2O$
         6. 0.1-18 wt % $K_2O$, and
         7. 1-7 wt % F, and
      ii. 0.1-15 wt % of a crystalline material selected from the group consisting of zinc borates, zinc silicates, zinc titanates, aluminum silicates, and combinations thereof, and
   b. firing the glass substrate and coating at a temperature sufficient to flow the enamel composition to cause the enamel composition to adhere to the substrate,
   wherein, after firing, the enamel composition is opaque and exhibits performance of chemical durability against wet through deterioration of at least 24 hours when tested in 0.1 N $H_2SO_4$ at 80° C.

20. The method of claim 19, wherein, prior to applying to the enamel composition to the glass substrate, a conductive silver-containing metal trace is applied to the glass substrate.

* * * * *